(12) United States Patent
Lin

(10) Patent No.: US 6,786,403 B2
(45) Date of Patent: Sep. 7, 2004

(54) MASS-PRODUCTION COMPOUND CONTACTLESS ELECTROMAGNETIC INDUCED IDENTIFICATION CODE IC

(75) Inventor: Chung-Ping Lin, Hsinchu (TW)

(73) Assignee: Windbond Electronics Corp., Hsinchu (TW)

( * ) Notice: Subject to any disclaimer, the term of this patent is extended or adjusted under 35 U.S.C. 154(b) by 283 days.

(21) Appl. No.: 10/189,543

(22) Filed: Jul. 8, 2002

(65) Prior Publication Data

US 2003/0160099 A1 Aug. 28, 2003

(30) Foreign Application Priority Data

Feb. 22, 2002 (TW) ........................................ 91103231 A

(51) Int. Cl.[7] ........................ G06K 15/00; G06K 19/06
(52) U.S. Cl. ........................ 235/383; 235/449; 235/492
(58) Field of Search ................................ 235/383, 380, 235/449, 492, 493, 486, 487, 441

(56) References Cited

U.S. PATENT DOCUMENTS

| | | | | |
|---|---|---|---|---|
| 5,856,662 A | * | 1/1999 | Kohama et al. | 235/492 |
| 5,990,469 A | * | 11/1999 | Bechtel et al. | 250/208.1 |
| 5,992,754 A | * | 11/1999 | Ito et al. | 235/486 |
| 6,173,899 B1 | * | 1/2001 | Rozin | 235/492 |
| 6,439,464 B1 | * | 8/2002 | Fruhauf et al. | 235/492 |

* cited by examiner

Primary Examiner—Thien M. Le
(74) Attorney, Agent, or Firm—Bacon & Thomas PLLC

(57) ABSTRACT

The present invention provides a kind of contactless electromagnetic identification code IC circuit, which contains a control circuit to detect an input pad, and to provide a coding signal to decide one identification code for the contactless electromagnetic induced identification code IC. The control circuit contains: a carry clock signal source, which provides a carry clock signal to the input pad for generating a responding signal from the input pad; and a flip-flop set, which connects to the input pad, decides the identification code and forms the coding signal according to the pad's responding signal and the carry clock signal.

13 Claims, 3 Drawing Sheets

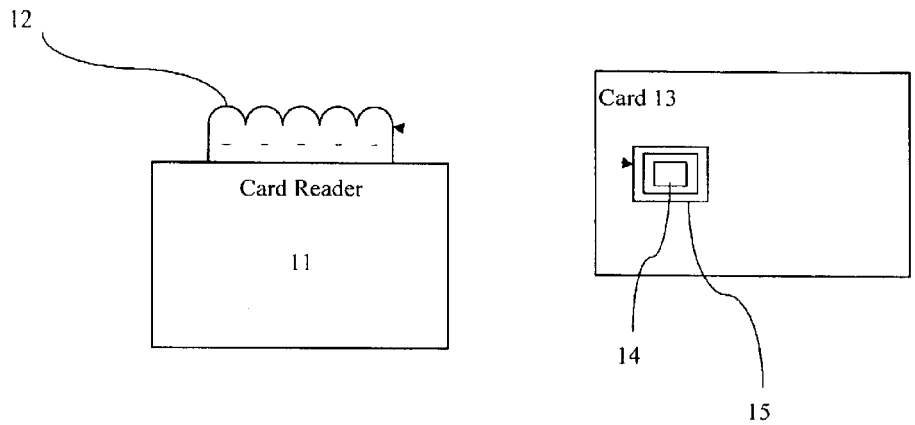
Figure 1 (Prior Art)
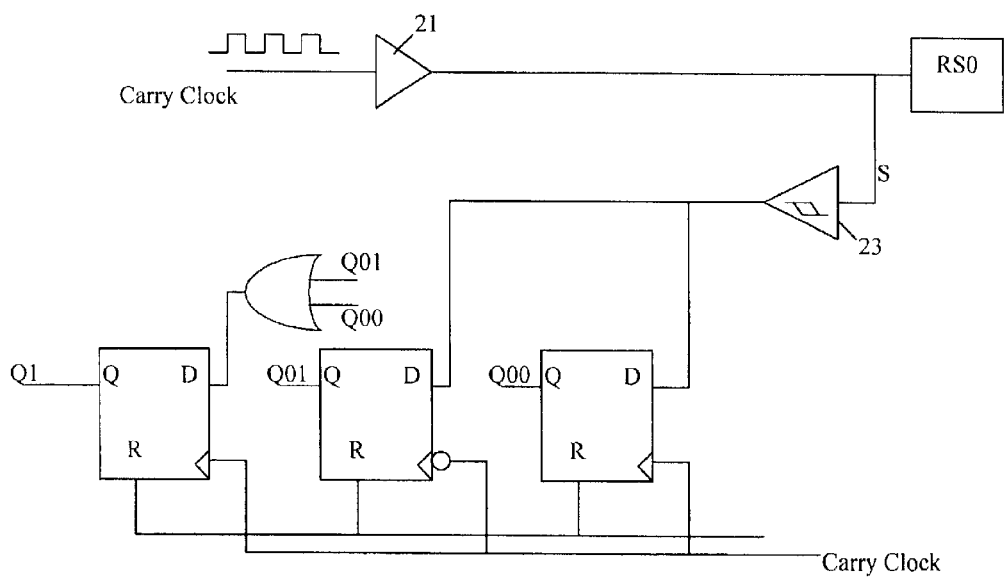
Figure 2(a)
Figure 2(b)
|  |  |  | Coding Signal | |
|---|---|---|---|---|
| RS0 | Q00 | Q01 | Q1 | Q0 |
| X | 1 | 0 | 1 | X |
| 1 | 1 | 1 | 0 | 1 |
| 0 | 0 | 0 | 0 | 0 |

| RS2 | RS1 | RS0 | Record | Coding Signal |
|---|---|---|---|---|
| X | X | X | 00000 | R0  10  10  10 |
| X | X | 0 | 00001 | R1  10  10  00 |
| X | X | 1 | 00010 | R2  10  10  01 |
| X | 0 | X | 00011 | R3  10  00  10 |
| X | 0 | 0 | 00100 | . |
| X | 0 | 1 | 00101 | . |
| X | 1 | X | 00110 | . |
| X | 1 | 0 | 00111 | . |
| X | 1 | 1 | 01000 | . |
| 0 | X | X | 01001 | . |
| 0 | X | 0 | 01010 | . |
| 0 | X | 1 | 01011 | . |
| 0 | 0 | X | 01100 | . |
| 0 | 0 | 0 | 01101 | . |
| 0 | 0 | 1 | 01110 | . |
| 0 | 1 | X | 01111 | . |
| 0 | 1 | 0 | 10000 | . |
| 0 | 1 | 1 | 10001 | . |
| 1 | X | X | 10010 | . |
| 1 | X | 0 | 10011 | . |
| 1 | X | 1 | 10100 | . |
| 1 | 0 | X | 10101 | . |
| 1 | 0 | 0 | 10110 | . |
| 1 | 0 | 1 | 10111 | . |
| 1 | 1 | X | 11000 | . |
| 1 | 1 | 0 | 11001 | . |
| 1 | 1 | 1 | 11010 | R26 01  01  01 |

MASS-PRODUCTION COMPOUND CONTACTLESS ELECTROMAGNETIC INDUCED IDENTIFICATION CODE IC

FIELD OF THE INVENTION

The present invention is relative to contactless electromagnetic induced identification code ICs, especially for those ICs that designate identification code by pads' number.

BACKGROUND OF THE INVENTION

General identification codes are stored in the magnetic cards, and every card has one identification code. When a magnetic card is rushed through a card reader, the card reader could be able to identify the card user by the identification code stored in the card. But it is inconvenient for a user to take a card and rushes through the card reader for identifying. So, contactless electromagnetic induced identification code is invented to improve the usage drawback of magnetic cards.

Contactless electromagnetic induced identification code is able to identify the identification code by electromagnetic wave, which technology is shown as FIG. 1. Induction Coil 12, which locates at Card Reader 11, is able to issue magnetic power. There is a contactless electromagnetic induced identification code IC 14 and an Induction Coil 15 hided in Card 13, and an identification code is also generated in this card. When Card 13 closes to the code reader, induction coil 15 will be coupled and provides electric power for the IC because of electromagnetic induction theory, and then the code stored in the IC will pass to card reader 11 for identifying via induction coil 15 (which can be used as a magnetic induction coil). So, closing the card and the card reader but not rushing through it can identify a user's code.

But above traditional technology is designed for security, so there is a unique identification code stored in every card's IC. If there are 100 people that need to be identified, then it is necessary to create 100 identification codes and stored in 100 ICs respectively. Therefore we need 100 masks to implement these ICs with very high cost. This is a special requirement of non-mass production. But not suitable for mass-produced product, just likes card toils.

SUMMARY OF THE INVENTION

The mainly object of present invention is, providing a design solution for "contactless" electromagnetic induced identification code application. That is, combining IC pads with special circuit design to generate three different kinds of logical voltage exist in one pad. With this design, "contactless" electromagnetic induced identification code IC can be mass-produced and very low cost on the application of electromagnetic induced identification code.

For production cost, to generate a code in a general "contactless" electromagnetic induced identification code IC needs the total fee of an IC mask. But the solution of the present invention reduces lots of production cost, which generates several identification codes for "contactless" electromagnetic induced identification code ICs with only one mask. The theory of present invention is based on the third power ($x^3$) extension of an input pad. For example, we may create $3^3=27$ kinds of identification codes by 3 input pads; by the same reason, 125 different identification codes can be created by 5 input pads; and most important of all, these different codes can be created by one mask only when the ICs are produced.

In the other words, the present invention provides a new solution for above mass-produced identification code products, which creates several identification codes in one IC chip by one mask, and reduces the production cost by special input pads and control circuit.

For above purpose, the present invention provides a kind of contactless electromagnetic identification code IC circuit, which contains a control circuit to detect an input pad, and to provide a coding signal to decide one identification code for the contactless electromagnetic induced identification code IC. The control circuit contains:

A Carry Clock signal source, which provides a carry clock signal to the input pad for generating a responding signal from the input pad; and A flip-flop set, which connects to the input pad, decides the identification code and forms the coding signal according to the pad's responding signal and the carry clock signal.

In accordance with one aspect of the present invention, the input pad's responding signal contains three kinds of potential levels: a low potential level, a high potential levels, and a floating potential level.

In accordance with one aspect of the present invention, there is a buffer that locates between the carry clock signal source and the input pad.

In accordance with one aspect of the present invention, the flip-flop set is D-type.

In accordance with one aspect of the present invention, the D-type flip-flop set contains three D-type flip-flops.

In accordance with one aspect of the present invention, there is a Schmidt trigger that locates between the flip-flop set and the input pad.

In accordance with one aspect of the present invention, the coding signal is a 2-bits coding signal for presenting the three types of the input pad.

The contactless electromagnetic induced identification code IC of present invention contains one input pad at least. The input pad is used for coding purpose, which generates one of the three input pad types to decide an identification code for the contactless electromagnetic induced identification code IC.

In accordance with one aspect of the present invention, the three states of the input pad are high level, low level, and floating level.

In accordance with one aspect of the present invention, the producing process is a kind of bonding producing process.

In accordance with one aspect of the present invention, the number of input pads can be N, which is an integer that larger than 0.

In accordance with one aspect of the present invention, the N input pads decide three powers of N kinds of identification codes.

In accordance with one aspect of the present invention, the three powers of N kinds of identification codes are stored in the IC.

The present invention may best be understood through the following description with reference to the accompanying drawings, in which:

BRIEF DESCRIPTION OF THE DRAWINGS

FIG. 1 is a block diagram of traditional contactless electromagnetic induced identification code;

FIGS. 2(a)(b) is the input pad level control circuit with three states and its true-false value table according to the present invention;

FIG. 3 is the coding table in the IC read only memory according to the present invention;

DETAILED DESCRIPTION OF THE PREFERRED EMBODIMENT

The fundamental architecture of present invention can be separated into two mainly components: the first part is 3-state logic level control circuit; and the second part is 3-state input bonding-pad layout.

FIG. 2(a) shows the 3-state logic level control circuit of present invention example, which is a kind of Carry Clock signal source; after going through Buffer 21, the responding signal S of input pad RS0 can be high level, low level, or floating level; and the input of Schmidt Trigger Circuit 23 can also be high level, low level, or floating level, which depends on the potential level of input pad. The three D-type flip-flops are used to generate the coding signals (Q1 and Q0) with three data formats.

RS0 is a 3-state logic level input pad, which 3 states contains:

"1": High level;

"0": Low level; and

"X": Floating level.

These 3 input level are decided by the usage requirements of users' design.

If the design is high logic level input, then connect this pad with bonding when the IC is bonding.

If the design is low logic level input, then connect this pad with low potential level when the IC is bonding, that is grounding this pad.

If the design is carry clock input, then ignore this pad and keep with its original floating potential when the IC is bonding.

That is, the potential level of input pad RS0 can be decided by designing requirement when the IC is bonding. After decided, control circuit can detect the potential level of input pad RS0 and the true-false table is listed as FIG. 2(b), which Q0 could be Q00 or Q01. The theory of circuit operating is quite simple, when input pad RS0 is high level and the Carry Clock is useless, then the potential level that responds in front of Schmidt Trigger's input would be high. If the input pad RS0 is low level, then Schmidt Trigger's input would be low level. Further more, if the input pad RS0 is floating level, then the Schmidt Trigger's input is Carry Clock. Based on this, control circuit can detect the potential level of input pads and coding by them.

FIG. 3 is a coding table in the IC read only memory of present invention example. Based on 3 input pads for example, there are 27 kinds of coding to generate 27 identification codes. The content of coding table in the read only memory are R0 to R26. There are three control circuits for the three input pads respectively. When the control circuits respond the data format of R0 back, then we can be sure that the three input pads (RS0, RS1, RS2) are all floating levels. If the control circuits respond the data format of R26 back, then all the three input pads (RS0, RS1, RS2) are high levels. By this way, we may generate 27 identification codes.

Figure 4:
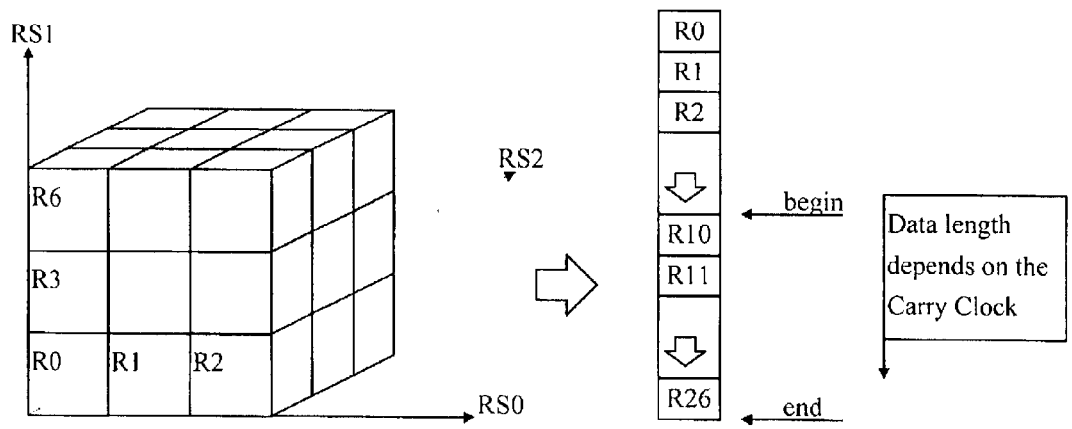
FIG. 4 is the corresponding relationship between Carry Clock and coding table according to the present invention.

FIG. 4 is the list of identification codes of present invention example. The code length of present invention is flexible without fixed length, which can be modified by designer's requirement. But all the modification have to be done after the codes are decided and before masking. This listing way is used for flexible length of identification codes, and the usage rate of memory can also be enhanced.

Further more, the design of present invention can also provide convenient and flexible applications of electromagnetic induced codes. That is, the present invention can generate several lengths of identification codes by only one mask. Just likes 32 bits, 64 bits, or 96 bits, all of them can be contained in the same mask to reduce the cost of designing and producing.

Figures 5A, 5B, 5C:
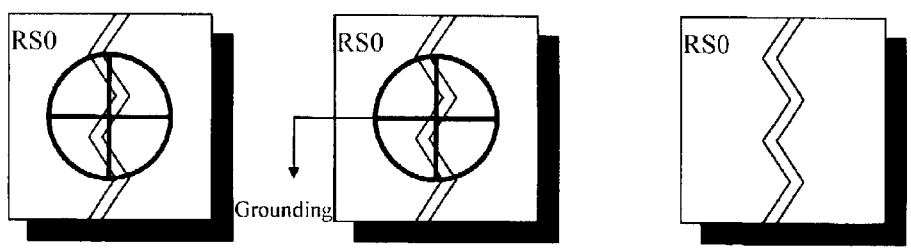
FIGS. 5(a)(b)(c) is the block diagram correspond to FIG. 4 according to the present invention.

FIGS. 5(a)(b)(c) is the bonding pad layout and connection of present invention example.

FIG. 5(a) shows the condition that connects input pad RS0 with high potential level by "touch-bonding" method.

FIG. 5(b) shows the condition that connects input pad RS0 with low potential level by "touch bonding" method. That is grounding the pad.

FIG. 5(c) shows the condition that keeps floating level in the input pad, and the Carry Clock will be sent to IC internal control circuit (just likes FIG. 2(a)).

To sum up, the present invention provides multiple identification codes choices by pre-designed input pads and control circuit, and user could decide pads' potential level during input pads are bonding by requirement. After bonding, the control circuit of IC will be able to detect the potential level of input pads to decide the identification code of IC. Then we may generate several identification codes in the IC by one mask, and the user can decide one of these codes by pin pads. This invention can be used in mass-produced identification codes products, just likes toy dolls, wording cards for kids, etc. Although 3-state logic level design is used in many different applications, but this is the first contrivance to be used in mass-produced "contactless" electromagnetic induced identification codes IC. And this invention can reduce lots of producing cost.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A mass-production compound contactless electromagnetic induced identification code IC circuit having a control circuit to detect an input pad, and to provide a coding signal to decide an identification code for said contactless electromagnetic induced identification code IC circuit, and said control circuit comprising:

a carry clock signal source providing a carry clock signal to said input pad for generating a responding signal from said input pad; and a flip-flop set connecting to said input pad and forming said coding signal according to said responding signal of said input pad and said carry clock signal in order to decide said identification code.

2. An IC circuit according to claim 1 wherein said input pad's responding signal contains three kinds of potential levels: a low potential level, a high potential levels, and a floating potential level.

3. An IC circuit according to claim 1 wherein a buffer is located between the carry clock signal source and the input pad.

4. An IC circuit according to claim 1 wherein said flip-flop set is D-type.

5. An IC circuit according to claim 4 wherein said D-type flip-flop set contains three D-type flip-flops.

6. An IC circuit according to claim 1 wherein a Schmidt trigger is located between the flip-flop set and the input pad.

7. An Ic circuit according to claim 1 wherein said coding signal is a 2-bits coding signal for presenting three types of said input pad.

8. A mass-production compound contactless electromagnetic induced identification code IC circuit having an input pad at least, said input pad being used for a coding purpose, which generating one of three input pad types to decide an identification code for said contactless electromagnetic induced identification code IC circuit with a producing process.

9. An IC circuit according to claim 8, wherein said three states of said input pad are a high level, a low level, and a floating level.

10. An IC circuit according to claim 8, wherein said producing process is a bonding producing process.

11. An IC circuit according to claim 8, wherein a number of said input pad can be N, which is an integer that larger than 0.

12. An IC circuit according to claim 11, wherein said N input pads decide three powers of N kinds of identification codes.

13. An IC circuit according to claim 12, wherein said three powers of N kinds of identification codes are stored in said IC circuit.

* * * * *